No. 858,723. PATENTED JULY 2, 1907.
H. KAMINSKI.
STEERING WHEEL FOR MOTOR VEHICLES.
APPLICATION FILED DEC. 10, 1906.
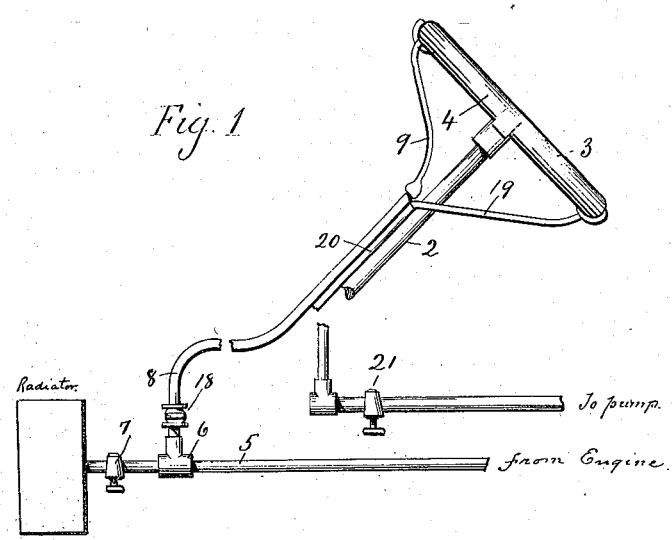
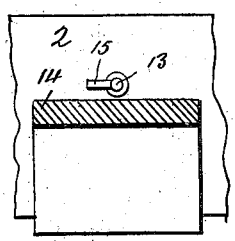
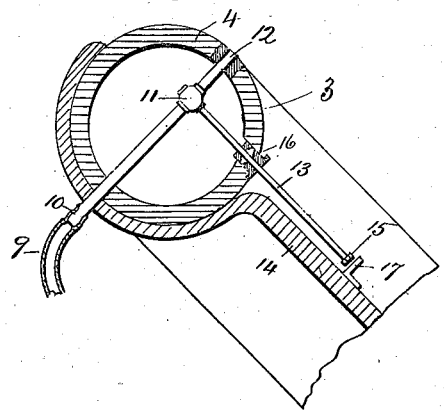

UNITED STATES PATENT OFFICE.

HAROLD KAMINSKI, OF GEORGETOWN, SOUTH CAROLINA.

STEERING-WHEEL FOR MOTOR-VEHICLES.

No. 858,723.  Specification of Letters Patent.  Patented July 2, 1907.

Application filed December 10, 1906. Serial No. 347,056.

*To all whom it may concern:*

Be it known that I, HAROLD KAMINSKI, a citizen of the United States, residing at Georgetown, in the county of Georgetown and State of South Carolina, have invented a new and useful Improvement in Steering-Wheels for Motor-Vehicles; and I do hereby declare the following, when taken in connection with the accompanying drawings and the letters of reference marked thereon, to be a full, clear, and exact description of the same, and which said drawings constitute part of this specification, and represent, in—

Figure 1 a side view of a steering wheel for motor vehicles shown in connection with the upper part of a steering rod and indicating diagrammatically the connections between the steering wheel and the operative parts of the motor. Fig. 2 an enlarged sectional view through the upper part of the steering wheel rim. Fig. 3 a broken view of a section of the rim showing the operating handle of the vent valve stem.
This invention relates to an improvement in steering mechanism for motor vehicles, the object being to provide means for heating the rim of the steering wheel; and the invention consists in the construction hereinafter described and particularly recited in the claims.
In illustrating my invention, I show only so much of the mechanism as is necessary for a clear understanding of my invention, indicating the parts diagrammatically rather than as illustrating the operative position of the motor vehicle parts. Usually the steering post 2 is arranged at an angle, the steering wheel 3 mounted at the upper end thereof standing in a plane at right angles to the post. The rim 4 is formed from metal and made hollow and preferably covered with leather. In a pipe 5 leading from the engine to the radiator I locate a T 6 and between the T and the radiator I locate a valve 7. From this T a pipe 8 extends upward alongside the post 2 to a point near its upper end where it is connected with a flexible tube 9 which is coupled with a nipple 10 entering the said rim. The upper end of the nipple is attached to a two-way valve 11 which opens at the top through a vent tube 12 extending through the rim opposite the nipple. This two-way valve 11 is operated by a valve-rod 13 extending outward through the rim over one of the spokes 14 of the wheel, the stem being provided at its outer end with a handle 15 which turns down onto the spoke when the valve is closed and projects upward therefrom when the valve is open so as to indicate at once the condition of the valve. It will be understood that the valve stem 13 passes through a suitable stuffing box 16 and may be held against outward movement by a lug 17 secured to the spoke 14 so that the stem will be held in engagement with the valve. When the valve is open water is admitted to the rim, and when closed the vent is open. In the pipe 8 is a valve 18 which, with the valve 7 will be located at points convenient for access. Opening out of the lowermost point of the rim is a flexible tube 19 connected with a pipe 20 which leads to the pump, and in this pipe I locate a valve 21 convenient for access. The tubes 9 and 19 are preferably flexible so as to permit the necessary turning of the steering wheel.

In operation the valve 7 is adjusted so as to retard the flow of hot water from the engine to the radiator causing a portion of it to pass upward through the pipe 8, the valve 18 being open for that purpose. Hot water passing upward through the pipe 8 and flexible tube 9 enters the rim 4 filling it and imparting heat thereto. From the rim the water escapes through the flexible tube 19 and pipe 20 to the pump, the valve 21 being adjusted to correspond to the amount of water fed.

To avoid freezing when the car is not in use, the valve 18 may be closed, shutting off the supply of water from the engine, and the valve 21 left open to permit the water to escape from the rim which it will do owing to the inclined position thereof, the vent tube 12 preventing a vacuum.

I claim:—

1. The combination with a steering wheel, for motor vehicles, having a hollow rim, of connections from an engine to said rim and from said rim to a pump, substantially as described.

2. The herein described steering wheel for motor vehicles comprising a tubular rim, an inlet pipe entering the said rim at one side, an outlet pipe opening from said rim at the opposite side, and a vent in said rim, substantially as described.

3. A steering wheel for motor vehicles comprising a hollow rim, a two-way valve located within said rim, a pipe coupled with said valve and leading to one branch of a water-circulating system, a tube connected with the lower side of said rim, and coupling with another branch of the circulating system, and a valve stem connected with said two-way valve and extending outward through said rim, substantially as described.

In testimony whereof, I have signed this specification in the presence of two subscribing witnesses.

HAROLD KAMINSKI.

Witnesses:
FREDERIC C. EARLE,
CLARA L. WEED.